United States Patent
Chien et al.

(10) Patent No.: US 7,956,937 B2
(45) Date of Patent: Jun. 7, 2011

(54) PROJECTION APPARATUS AND COLOR-LEVEL CORRECTING METHOD THEREFOR

(75) Inventors: Wen-Chang Chien, Miao-Li County (TW); Fan Chiang Chih-Heng, Miao-Li County (TW)

(73) Assignee: Coretronic Corporation, Hsinchu (TW)

(*) Notice: Subject to any disclaimer, the term of this patent is extended or adjusted under 35 U.S.C. 154(b) by 1306 days.

(21) Appl. No.: 11/486,480

(22) Filed: Jul. 13, 2006

(65) Prior Publication Data

US 2007/0030401 A1 Feb. 8, 2007

(30) Foreign Application Priority Data

Aug. 3, 2005 (TW) .............................. 94126312 A

(51) Int. Cl.
*H04N 9/12* (2006.01)
(52) U.S. Cl. ...................................................... 348/743
(58) Field of Classification Search .................... 345/83, 345/82
See application file for complete search history.

(56) References Cited

U.S. PATENT DOCUMENTS

| 5,706,061 | A | * | 1/1998 | Marshall et al. ............... 348/743 |
| 5,967,636 | A | * | 10/1999 | Stark et al. ....................... 353/84 |
| 6,054,832 | A | * | 4/2000 | Kunzman et al. .............. 318/600 |
| 6,084,235 | A | * | 7/2000 | Breithaupt et al. ............ 250/233 |
| 6,517,210 | B2 | * | 2/2003 | Peterson et al. ................. 353/98 |
| 6,520,648 | B2 | * | 2/2003 | Stark et al. ....................... 353/85 |
| 6,738,104 | B2 | * | 5/2004 | Marshall ....................... 348/743 |
| 7,066,607 | B2 | * | 6/2006 | Kwon .............................. 353/98 |
| 7,088,321 | B1 | * | 8/2006 | Parker .............................. 345/83 |
| 2009/0141188 | A1 | * | 6/2009 | Shirai et al. ................... 348/743 |

* cited by examiner

Primary Examiner — Paulos M Natnael
(74) Attorney, Agent, or Firm — J.C. Patents

(57) ABSTRACT

A projection apparatus, an illumination module and a color-level correcting method therefor are provided. The projection apparatus comprises a projection lens, an imaging unit and an illumination module. The illumination module comprises a light source, a color wheel and a controlling unit. The light source provides a light beam. The color wheel is disposed on an optical path of the light beam and the controlling unit is connected to the color wheel and the imaging unit. A plurality of color wheel indices is stored in the controlling unit. When the projection apparatus receives an image signal, the controlling unit selects one of the color wheel indices according to the received image signal and controls the imaging unit according to the selected color wheel index. The projection apparatus automatically selects the corresponding color wheel index according to the received image signal for projecting an image with good tints and color-level performance.

9 Claims, 3 Drawing Sheets

PROJECTION APPARATUS AND COLOR-LEVEL CORRECTING METHOD THEREFOR

CROSS-REFERENCE TO RELATED APPLICATION

This application claims the priority benefit of Taiwan application serial no. 94126312, filed on Aug. 3, 2005. All disclosure of the Taiwan application is incorporated herein by reference.

BACKGROUND OF THE INVENTION

1. Field of the Invention

The present invention relates to a projection apparatus and correcting method therefor. More particularly, the present invention relates to a projection apparatus, an illumination module and a color-level correcting method therefor.

2. Description of the Related Art

Referring to FIGS. 1A and 1B, a conventional projection apparatus 100 comprises an optical engine 110 and a projection lens 120. The optical engine 110 includes a light source 112, a color wheel 114, a controlling unit 116 and a light valve 118. The light source 112 is suitable for providing a light beam 112a and the color wheel 114 is configured between the light valve 118 and the light source 112. Furthermore, the controlling unit 116 is electrically connected to the color wheel 114 and the light valve 118.

The color wheel 114 has a red filtering region R, a green filtering region G and a blue filtering region B. The controlling unit 116 is suitable for controlling a rotational speed of the color wheel 114. The light beam 112a provided by the light source 112 passes through the red, the green and the blue color-filtering regions R, G, B in turn to produce red light, green light and blue light. In addition, the light valve 118 is driven by the controlling unit 116 to present different states corresponding to the red, green and blue light. Hence, red, green and blue light are converted into red image, green image and blue image respectively. Thereafter, the projection lens 120 projects the red, green and blue image onto a screen and produce a full color image onto the screen.

In the conventional projection apparatus 100, a signal transmitting device 117 is normally disposed on the color wheel 114. Furthermore, a signal sensing device 119 is also installed at a suitable distance away from the signal transmitting device 117 for receiving the signal 117a transmitted from the signal transmitting device 117. The signal transmitting device 117 follows the rotation of the color wheel 114, so that a time interval between two received signals from the signal transmitting device 117 selecting by the signal sensing device is a rotational period of the color wheel 114. Moreover, the signal sensing device 119 and the controlling unit 116 are electrically connected so that a rotational frequency of the color wheel 114 is computed through the controlling unit 116. Therefore, the passing time for the light beam 112a through the red, greens and blue color-filtering regions R, G, B is computed.

However, slight positional error often occurs in a process of attaching the signal transmitting device 117 to the color wheel 114. Thus, the controlling unit 116 can not accurately compute the respective intervals for the passing time of the light beam 112a through the red, green and blue color-filtering regions R, G and B for controlling the light valve 118. As a result, the color of the image projected by the projection apparatus 100 can not have expected color. At present, one solution is to store a color wheel index in the controlling unit 116 so that the any timing discrepancies between the color wheel 114 and the light valve 118 can be compensated by referring to the color wheel index. With suitable compensation, the timing error is reduced and the image projected from the projection apparatus 100 is more in line with the expected image colors.

The conventional projection apparatus 100 normally has only single color wheel index. However, the signals input into the projection apparatus 100 have different resolutions or vertical synchronous scanning frequencies. Furthermore, the rotational speed of the color wheel changes according to the frequency of the input signal. Therefore, using just one single color wheel index, it is still impossible to compute the intervals for the passage of the light beam 112a through the red, green and blue color-filtering regions R, G and B. Ultimately, the conventional projection apparatus 100 leads to some ruggedness in the color level of the projected image from the projection apparatus 100.

SUMMARY OF THE INVENTION

One objective of the present invention is to provide an illumination module having a good color level performance.

Another objective of the present invention is to provide a color level correcting method for correcting a projection apparatus so that the color level performance of an image projected from the projection apparatus can be improved.

Still another objective of the present invention is to provide a projection apparatus capable of automatically adjusting a color wheel index according to different input signal so that a color level performance of an image projected from the projection apparatus can be improved.

To achieve these and other advantages and in accordance with the purpose of the invention, as embodied and broadly described herein, the present invention provides an illumination module. The illumination module comprises a light source, a color wheel and a controlling unit. The light source is suitable for providing a light beam. The color wheel is disposed on an optical path of the light beam. The controlling unit is connected to the color wheel. Furthermore, a plurality of color wheel indices is stored in the controlling unit. When the illumination module receives an image signal, the controlling unit selects one of the color wheel indices according to the image signal.

The present invention also provides a projection apparatus. The projection apparatus comprises a projection lens, an imaging unit and the aforementioned illumination module. The projection lens is disposed on the optical path of the light beam provided by the aforementioned light source. The imaging unit is disposed between the illumination module and the projection lens and electrically connected to the aforementioned controlling unit.

The present invention also provides a color level correcting method for correcting the color level performance of a projection apparatus including a color wheel. The steps of the color level correcting method include inputting a plurality of color wheel indices into the projection apparatus. Then, an image signal is input in the projection apparatus. Thereafter, according to the frequency of the image signal, one of the color wheel indices is selected for controlling the projection apparatus.

In the present invention, a plurality of color wheel indices corresponding to the image signal at different frequencies is stored inside the projection apparatus. Hence, the projection apparatus can automatically select an appropriate color wheel index according to the received image signal so that the tint and color level performance of the picture projected from the projection apparatus can be improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
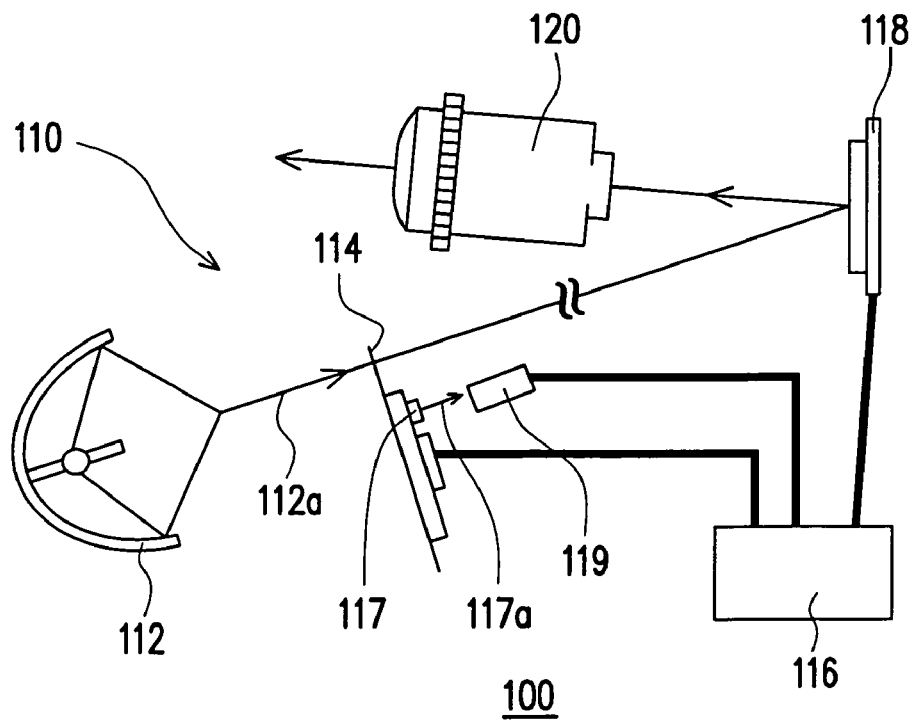
FIG. 1A is a diagram showing a conventional projection apparatus.

Reference will now be made in detail to the present preferred embodiments of the invention, examples of which are illustrated in the accompanying drawings. Wherever possible, the same reference numbers are used in the drawings and the description to refer to the same or like parts.

Figure 2:
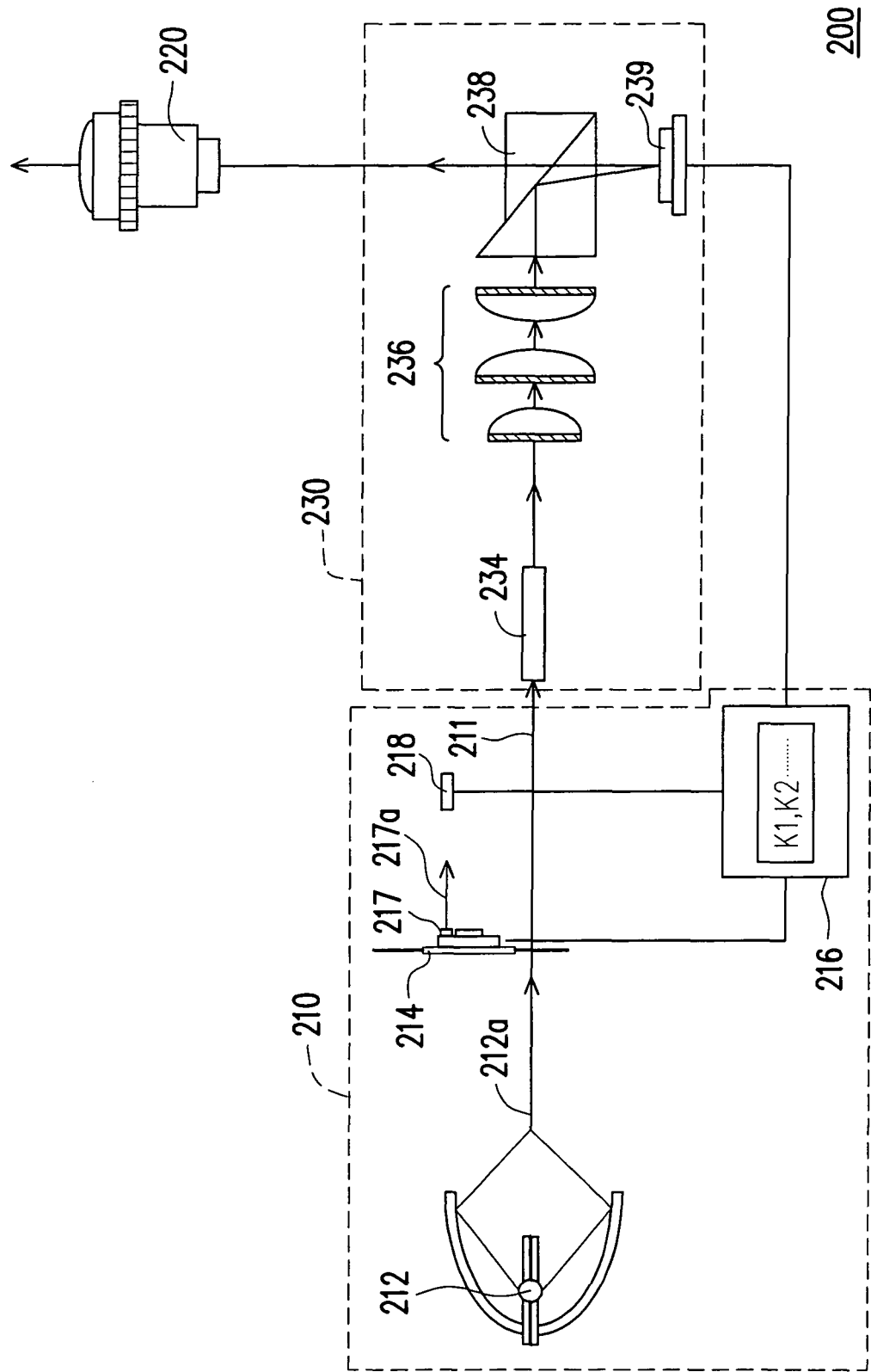
FIG. 2 is a diagram showing a projection apparatus according to one preferred embodiment of the present invention.

As shown in FIG. 2, a projection apparatus 200 comprises an illumination module 210, a projection lens 220 and an imaging unit 230. The illumination module 210 further comprises a light source 212, a color wheel 214 and a control unit 216. The light source 212 provides a light beam 212a. Furthermore, the light beam 212a is a white light beam, for example. In one embodiment, the light source 212 is a mercury lamp, a light-emitting diode (LED), a metallic halide lamp, a halogen lamp or a high intensity discharge (HID) lamp, for example.

The projection lens 220 is disposed on an optical path of the light beam 212a and the imaging unit 230 is disposed between the illumination module 210 and the projection lens 220. Furthermore, the imaging unit 230 comprises an integrating rod 234, a converging lens 236, a total internal reflection prism 238 and a light valve 239, for example.

Figure 1B:
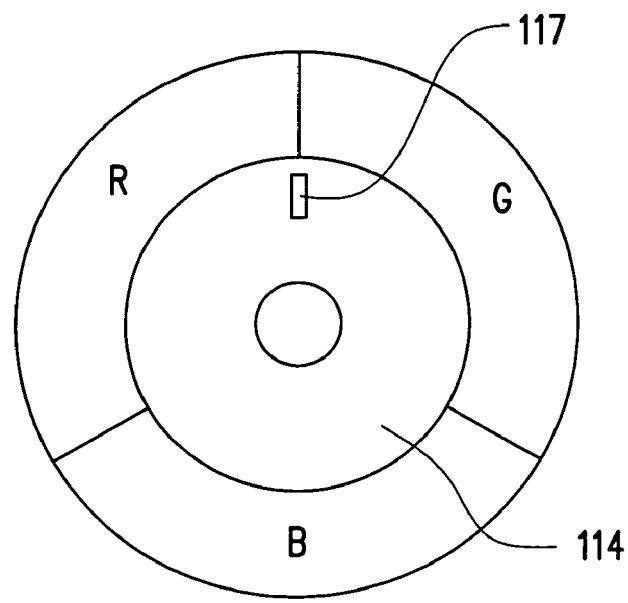
FIG. 1B is a diagram showing a color wheel of the FIG. 1A.

After the light beam 212a provided by the light source 212 passing through the color wheel 214, the light beam 212a is converted into a monochromatic light beam 211. For example, the color wheel 214 includes a red color-filtering region R, a green color-filtering region G and a blue color-filtering region B (as shown in FIG. 1B) so that the light beam 212a is converted into the various monochromatic light beams 211 (red, green, blue). Obviously, the color wheel 214 also includes a white color-filtering region (not shown). After the light beam 212a passing through this white color-filtering region, the light beam 211 remains a white beam.

The monochromatic light beam 211 passes through the integrating rod 234, the converging lens 236, the total internal reflection prism 238 to the light valve 239 in turn. Through the light valve 239, the monochromatic light beam 211 is converted to a monochromatic image. The monochromatic image is projected via the projection lens 230 onto a display screen (not shown). One skilled in the art may notice that red light, green light and blue light passes through the integrating rod 234, the converging lens 236, and the total internal reflection prism 238 in sequence to the light valve 239 within a frame period. Then, the light valve 239 converts the red light, green light and blue light into red image, green image and blue image to project a full color image onto the display screen through a projection lens 230. Here, the light valve 239 is a digital micro-mirror device (DMD) or a Liquid Crystal on Silicon (LCoS), for example.

As shown in FIG. 2, the illumination module 210 further includes a signal transmitting device 217 and a signal sensing device 218, for example. The signal transmitting device 217 is disposed on the color wheel 214 and the signal sensing device 218 is disposed at a suitable distance away from the signal transmitting device 217 for receiving a signal 217a from the signal transmitting device 217.

It is noted that a plurality of color wheel indices $K_1, K_2, \ldots$ and so on are stored inside the controlling unit 216. Furthermore, the controlling unit 216 is connected to the color wheel 214, the signal sensing device 218, and the light valve 239. When the projection apparatus 200 receives an image signal, the control unit 216 computes the frequency of the image signal according to the rotational speed of the color wheel 214 and the frequency of the signal 218a selected by the signal sensing device 218. Then, one of the color wheel indices that correspond to the frequency of the image signal is selected. According to the selected color wheel index, the light valve 239 is driven so that the tint and color level performance of an image projected from the projection apparatus can be improved.

To explain the function of the aforementioned projection apparatus, an embodiment is provided below so that the method of determining the aforementioned color wheel indices is also explained.

Figure 3:
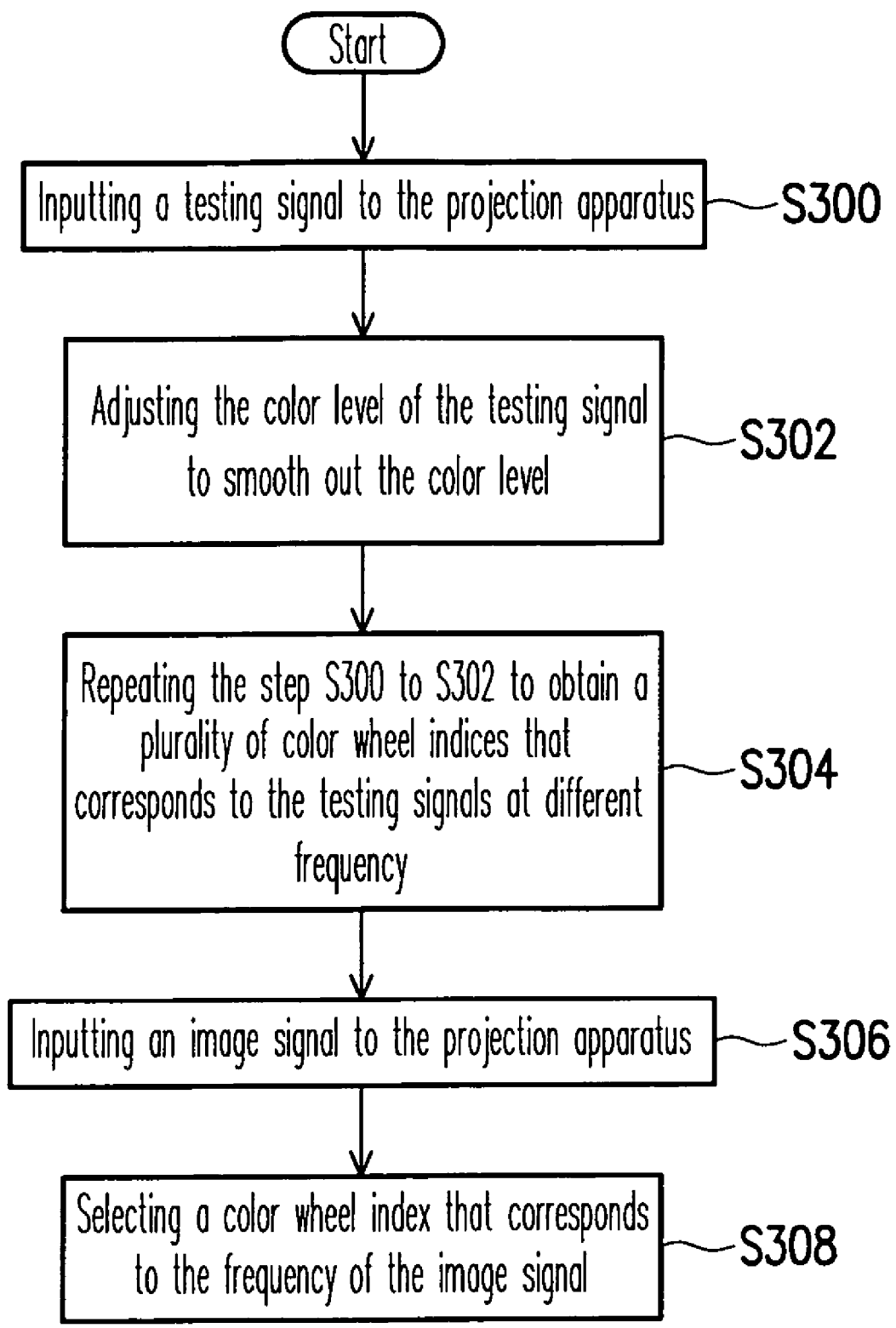
FIG. 3 is a flow diagram showing steps for correcting the color level of a projection apparatus according to one preferred embodiment of the present invention.

FIG. 3 is a flow diagram showing steps for correcting the color level of a projection apparatus according to one preferred embodiment of the present invention. The correcting method is suitable for correcting the color level performance of an image projected from a projection apparatus with a color wheel. To implement the correcting method, a plurality of color wheel indices is input into the projection apparatus. In the present embodiment, referring to the FIG. 3, the steps for determining the color wheel indices are described in steps S300 to S304. In step S300, a testing signal is input to the projection apparatus. Here, the range of the frequency of the testing signal is between 50 Hz to 150 Hz, for example.

Thereafter, step S302 is carried out to adjust the color level of the testing signal so that the color level is smoothed out. Then, in step S304, the steps from S300 to S302 are repeated a number of times to obtain a plurality of color wheel indices corresponding to the testing signals at different frequencies.

After obtaining the color wheel indices, the step S306 is carried out to input an image signal to the projection device. According to NTSC standard, the image signal is a 60 Hz signal with a digital RGB frequency between 60 Hz to 150 Hz, for example.

In step S308, a color wheel index that corresponds to the frequency of this image signal is selected so that the tint and color level performance of the image projected from the projection apparatus can be improved. The means of selecting the color wheel index in step S308 includes a table look-up method, for example. In other words, the relationship between the color wheel indices and the frequency of the image signal is stored as a table within the projection apparatus.

In summary, a plurality of color wheel indices corresponding to the image signal at different frequencies is stored inside the projection apparatus. Hence, the projection apparatus automatically selects an appropriate color wheel index according to the received image signal so that the tint and color level performance of the image projected from the projection apparatus can be improved.

Moreover, because the projection apparatus of the present invention can automatically select a suitable color wheel index, there is no need to perform a manual adjustment of the color wheel index when switching the signal input source connected to the projection apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color level correcting method suitable for correcting a color level performance of a projection apparatus having a color wheel, the color level correction method comprising the steps of:
   inputting a plurality of color wheel indices into the projection apparatus;
   inputting a image signal; and
   selecting one of the color wheel indices according to frequency of the image signal for controlling the projection apparatus;
   wherein before inputting the color wheel indices, the color level correcting method further comprises the steps of:
   a) inputting a test signal to the projection apparatus;
   b) adjusting a color level of the testing signal to generate a color wheel index corresponding to the color level of the testing signal; and
   c) repeating step (a) and (b) to obtain color wheel indices corresponding to testing signals at different frequencies.

2. The color level correcting method of claim 1, wherein the frequency of the testing signal is between 50 Hz to 150 Hz.

3. The color level correcting method of claim 1, wherein the step of selecting one of the color wheel indices according to the frequency of the image signal comprises a table look-up process.

4. A projection apparatus, comprising:
   an illumination module having:
   a light source suitable for providing a light beam;
   a color wheel disposed on an optical path of the light beam emitted from the light source;
   a controlling unit connected to the color wheel, wherein the controlling unit stores a plurality of color wheel indices, and the controlling unit is suitable for selecting one of the color wheel indices according to a received image signal;
   a projection lens disposed on the optical path of the light beam; and
   an imaging unit disposed between the illumination module and the projection lens and connected to the controlling unit, wherein the controlling unit controls the imaging unit according to the selected color wheel index.

5. The projection apparatus of claim 4, wherein the imaging unit further comprises a integrating rod and a light valve, wherein the color wheel is disposed between the light source and the integrating rod and the light valve is electrically connected to the controlling unit and suitable for converting the light beam passing through the integrating rod into an image and transmitting the image to the projection lens.

6. The projection apparatus of claim 5, wherein the imaging unit further includes at least one converging lens disposed between the integrating rod and the light valve.

7. The projection apparatus of claim 6, wherein the imaging unit further includes a total internal reflection prism suitable for reflecting the light beam passing through the converging lens to the light valve.

8. The projection apparatus of claim 5, wherein the light valve includes a digital micro-lens device (DMD) or a Liquid Crystal on Silicon (LCOS).

9. The projection apparatus of claim 4, wherein the illumination module further comprises:
   a signal transmitting device disposed on the color wheel, wherein the signal transmitting device is suitable for transmitting a signal; and
   a signal sensing device disposed next the color wheel and electrically connected to the controlling unit, wherein the signal sensing device is suitable for detecting the signal transmitted from the signal transmitting device.

* * * * *